Oct. 29, 1957 H. W. BLETZ 2,811,610
HIGH CONDUCTIVITY THERMOSTAT
Filed Feb. 27, 1956

INVENTOR.
HOWARD W. BLETZ
BY Woodling and Krost,
ATTORNEYS

United States Patent Office 2,811,610
Patented Oct. 29, 1957

2,811,610

HIGH CONDUCTIVITY THERMOSTAT

Howard W. Bletz, Lexington, Ohio, assignor to Stevens Manufacturing Company, Inc., a corporation of Ohio Application February 27, 1956, Serial No. 567,832

14 Claims. (Cl. 200—138)

The invention relates in general to condition responsive devices and more particularly to temperature responsive devices such as thermostats containing a temperature responsive element which, by utilizing a high conductivity metal, is placed in good heat exchange relationship with an appliance or other unit to which the condition responsive device is attached or used.

A specific embodiment of the invention is that it may be used in a thermostat incorporating a bimetallic element with the thermostat carrying electrical contacts for on-off control of an electrical heating appliance to which the thermostat is mounted. In many forms of thermostats the various elements or members therein are held together by a rivet which typically has been made of steel for strength to resist the tension forces therein when the thermostat is assembled and also to resist the compression forces therein when the thermostat is mounted to the appliance. Such rivets have in the past utilized a steel head which is integral with the shank of the rivet and which head is placed between the temperature responsive element, such as a bimetal, and the mounting surface of the appliance. This steel head has inferior heat conducting properties.

Therefore, an object of the invention is to incorporate in a thermostat a metal of high conductivity such as aluminum or copper to readily conduct heat from the appliance to the thermostat.

Still another object of the invention is to provide an aluminum washer as a part of a composite head on a rivet for a thermostat wherein the aluminum washer is in contact both with the bimetallic element of the thermostat and the mounting surface of the appliance being controlled by the thermostat, yet the rivet shank remains of steel for supplying the required strength.

Still another object of the invention is to provide good heat transfer from the appliance to the bimetallic element of the thermostat.

Still another object of the invention is to provide a thermostat having a smaller operating temperature differential, between open and closed conditions of the electrical contacts of the thermostat, than prior art thermostat.

Still another object of the invention is to provide a thermostat mounting rivet with a composite head wherein a part of the head is integral with the shank of the rivet of high strength metal and another part is formed of a high conductivity metal, with the two parts having complementary interfitting surfaces and both parts being substantially coplanar to rest upon the mounting surface of the appliance to which the thermostat may be attached.

Other objects and a fuller understanding of this invention may be had by referring to the following description and claims, taken in conjunction with the accompanying drawing, in which:

Figure 1:
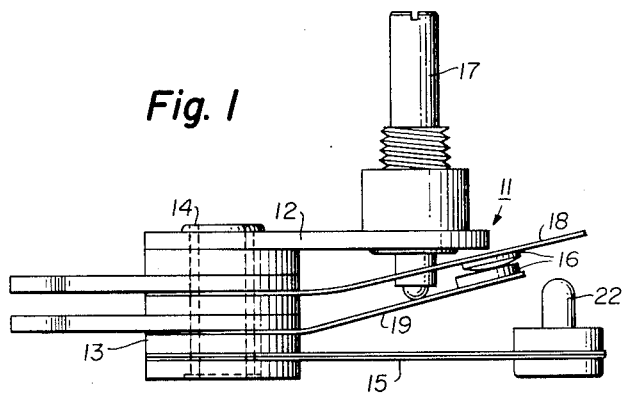
Figure 1 shows a side elevation view of a thermostat incorporating the invention.

The thermostat 11 shown in the drawing is illustrative of one form of the invention which may be applied to a condition responsive device, and especially one which is a temperature responsive device. The thermostat 11 may take any of several forms and has been shown as including generally a base 12, a stack 13, a rivet 14, a bimetallic member 15, contacts 16, and an adjusting screw 17. The contacts 16 are carried on flexible contact carrying members 18 and 19 and the adjusting screw 17 is threaded in and movable relative to the base 12 and passes through an aperture in the member 18 to bear against and adjustably move the member 19. This provides relative adjustment between the contacts 16.

The bimetallic element 15 carries an insulator button 22 to bear against and move the contact carrying member 18 to provide relative movement between the contacts 16 in response to changes in heat applied to the bimetallic member 15.

Figure 2:
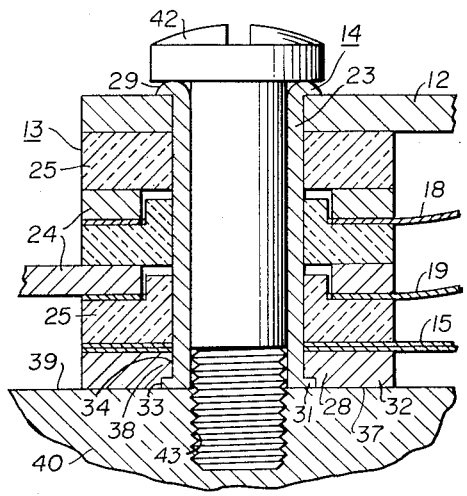
Figure 2 is an enlarged sectional elevational view of the stack of the thermostat.

As best shown in Figure 2, one end of each of the members 15, 18 and 19 is mounted in the stack 13 with a shank 23 of the rivet 14 passing through a hole in each of these members. Terminals 24 are positioned in contact with each of the members 18 and 19 in the stack 13, and insulator washers 25 are also provided in the stack 13 to mutually insulate the contact carrying members 18 and 19. In the case shown, the insulator washers 25 insulate the contact carrying members 18 and 19 from the shank 23.

Figure 3:
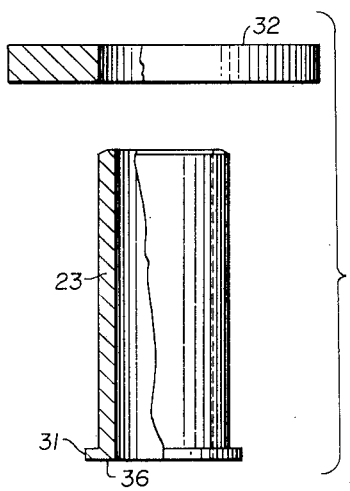
Figure 3 is an exploded view of the composite rivet before assembly.

The rivet 14 has a first head 28 which is a composite head, and also has a second head 29. This second head may be spun over or pressed over the top of the base 12 to hold together the elements in the stack 13. The first head 28 has a first part 31 and a second part 32. The first part 31, as best shown in Figure 3, is integral with the shank 23 and this Figure 3 shows the rivet 14 before its assembly as a composite rivet. The shank 23 and first part 31 of the head 28 may be made of steel or other suitable material as is customary in the industry. The second part 32 of the head 28 is made of a metal of good conductivity relative to steel, and aluminum and copper are two such materials which have been found to be quite satisfactory. As shown in Figure 2, the aluminum washer or second part 32 has a stepped inner bore of first and second portions 33 and 34, respectively. The first portion 33 of the bore has a diameter substantially equal to the diameter of the first part 31 of the head 28 and has a depth substantially equal to the axial thickness of this first part 31 to receive this first part 31. The axial thickness of the first part 31 may be slightly less than, but generally in the same order of thickness, as the wall thickness of the shank 23. Also, the radial dimension of the first part 31 outboard of the outer diameter of the shank 23 may be approximately equal to the wall thickness of the shank 23 although this is not essential. It has clearly been found that this first part 31 may be made quite small in both axial and outboard radial dimensions and still operates satisfactorily to resist the tension and compression forces to which the rivet 14 is subjected.

The second portion 34 of the stepped bore has a diameter equally substantial to the outer diameter of the shank 23 to be received on this shank. This stepped bore 33—34 is of such proportions as to form a contact surface which is complementary to and interfitting with the outer surface of the shank 23 and first part 31 so that a first outer planar surface 36 on the first part 31 is substantially coplanar with a second outer planar surface 37 on the high conductivity washer 32. Also, the axial thickness of the high conductivity washer 32 may be in the order of two to three times that of the axial thickness of the first part 31. Also, the thickness of the high conductivity washer 32 may be at least twice the wall thickness of the rivet shank 23.

The use of either copper or aluminum for the high conductivity washer 32 permits a method of assembly of the composite rivet 14 which has additional advantages. The two parts of the composite rivet 14, as shown in Figure 3, may be assembled by merely placing the two parts in a press and pressing the first part 31, which is an integral head on the rivet shank 23, until this first part has been pressed into this high conductivity washer 32. The aluminum or copper material, for example, of the washer 32, being considerably softer than the steel shank, permits this deformation. This pressing operation also assures that the stepped bore 33—34 is just exactly the right size to receive the first part 31 of the head without any excess clearance. This not only assures good heat transfer from the first part 31 to the high conductivity washer 32 but also slightly compacts the metal of the high conductivity washer 32 in the area 38 so that it is more dense to thus more effectively resist compression forces therein.

The rivet 14 may be considered a stress member and initially as a tension stress in the shank 23 caused by compressing the stack 33 and pressing over the second head 29 against the base 12 to hold all the elements in the stack 13. When the compression force is released on the stack 13, this places a tensile stress on the shank 23. This tensile stress is resisted by compression in the area 38 of the high conductivity washer 32. As shown in Figure 2, the entire thermostat may be mounted against a mounting surface 39 of an appliance 40 which may be an electrical heating appliance electrically controlled by the contacts 16. The heat of the appliance 40 therefore is at the mounting surface 39 and must be transmitted to the bimetallic member 15 effectively in order to operate the thermostat 11. The high conductivity washer 32 performs this function providing a good heat transfer from the mounting surface 39 to the bimetallic member 15. The rivet 14 still retains the steel shank 23 to resist compression forces caused when a mounting member such as a bolt 42 is passed through the hollow shank 23 into a tapped hole 43 in the appliance 40. When the thermostat is mounted on the appliance as shown in Figure 2, the outer planar surface 37 of the high conductivity washer 32 is contiguous with, that is, in contact with, the mounting surface 39 and at the same time this high conductivity washer 32 is contiguous with the bimetallic member 15. This provides a very good heat exchange from the appliance 40 to the bimetallic member 15.

In practice thermal response tests have shown the improvement caused by this high conductivity washer 32 as compared to the prior art style of thermostat wherein the entire first head 28 was made of steel and integral with the shank 23. Such thermal response tests have shown that a thermostat of the present invention has a temperature differential between off and on conditions almost exactly one-half that of the temperature differential of an all steel head 28. Also, the initial overshoot is about one-half, with initial overshoot being defined as a condition wherein if the appliance is initially heated from room temperature to the operating temperature, it passes the preset operating temperature about which subsequent oscillations of temperature fluctuate as a mean. This initial overshoot is in most all cases greater than the subsequent fluctuations caused by the off and on conditions of the contacts 16 because of the thermal lag in all of the metal parts ambient to the thermostat and appliance.

The composite rivet thus has a high conductivity head for very good thermal response, yet retains the steel shank for strength. This composite rivet is therefore practical in use, whereas it would be impractical if the entire rivet were made from high conductivity metal which would be relatively soft, because the shank must have a strength sufficient to resist the tension forces therein when it holds the stack together as shown in Figure 1, and to resist the compression forces caused by the mounting bolt 42 as shown in Figure 2.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A stress member for a condition responsive device, comprising, a shank, a composite head on one end of said shank formed of first and second parts, said first part being attached to said shank and composed of essentially the same material, a contact surface on said first part, said second part being of good heat conductivity relative to said first part and having a surface complementary to said contact surface for interfitting engagement with said first part, whereby said stress member may be assembled in a condition responsive device with a surface of said second part co-planar with a surface of said first part and contiguous to a condition responsive element therein.

2. A stress member for a thermostat, comprising, a shank, a composite head on one end of said shank formed of first and second parts, said first part being attached to said shank and composed of essentially the same material, said second part being of good heat conductivity relative to said first part and having a stepped inner bore of first and second portions, said first portion having a diameter substantially equal to the diameter of said first part and having a depth substantially equal to the axial thickness of said first part to receive same, said second portion having a diameter substantially equal to the outer diameter of said shank, whereby said stress member may be assembled in a thermostat with said second part contiguous to a temperature responsive element therein.

3. A rivet for a thermostat, comprising, a metal shank, an integral head on one end of said shank, a washer of good heat conductivity relative to said shank and having a stepped inner bore of first and second portions, said first portion having a diameter substantially equal to the diameter of said head and having a depth substantially equal to said axial thickness to receive said head, said second portion having a diameter substantially equal to the outer diameter of said shank, whereby said rivet may be assembled in a thermostat with said washer contiguous to a bimetallic element therein and contiguous to an appliance to which the thermostat may be fastened with good heat conductivity from the appliance to the bimetallic element of the thermostat provided by said washer.

4. A rivet for an electrical thermostat, comprising, a steel shank of a given wall thickness, an integral head on one end of said shank, said head having an axial thickness approximating said given wall thickness, a washer of good heat conductivity relative to steel and having a stepped inner bore of first and second portions, said first portion having a diameter substantially equal to the diameter of said head and having a depth substantially equal to said axial thickness to receive said head, said second portion having a diameter substantially equal to the outer diameter of said shank, whereby said rivet may be assembled in a thermostat with said washer contiguous to a bimetallic element therein and contiguous to an appliance to which the thermostat may be fastened with good heat conductivity from the appliance to the bimetallic element of the thermostat provided by said washer.

5. A hollow rivet for the stack of an electrical thermostat, comprising, a hollow steel shank of a given wall thickness, a first integral head on one end of said shank and having a radial dimension outboard of the outer diameter of said shank approximately equal to said given wall thickness, said first head having an axial thickness approximating said given wall thickness, an aluminum washer of good heat conductivity having a stepped inner bore of first and second portions, said first portion having a diameter substantially equal to the diameter of said first head and having a depth substantially equal to said axial thickness to receive said first head, said second portion having a diameter substantially equal to the outer diameter of said shank, whereby the shank of said hollow rivet may be asembled through elements and the base of the thermostat with said aluminum washer contiguous with said first head and a bimetallic element of said thermostat and a second head may be formed on the opposite end of the shank to hold such elements in place and a mounting screw may be inserted through the hollow rivet to fasten said thermostat to an appliance with good heat conductivity from the appliance to the bimetallic element of the thermostat provided by said aluminum washer.

6. A hollow rivet for the stack of an electrical thermostat, comprising, a hollow steel shank of a given wall thickness, a first integral upset head on one end of said shank and having a radial dimension outboard of the outer diameter of said shank approximately equal to said given wall thickness, said first head having an axial thickness approximating said given wall thickness, an aluminum washer of good heat conductivity received on said shank and pressed onto said first head to have a stepped inner bore of first and second portions, said washer having a thickness in the order of two to three times that of said axial thickness of said head, said first portion having a diameter substantially equal to the diameter of said first head and having a depth substantially equal to said axial thickness to receive said first head, said second portion having a diameter substantially equal to the outer diameter of said shank, whereby the shank of said hollow rivet may be assembled through elements and the base of the thermostat with said aluminum washer contiguous with said first head and a bimetallic element of said thermostat and a second head may be formed on the opposite end of the shank to hold such elements in place and a mounting screw may be inserted through the hollow rivet to fasten said thermostat to an appliance with good heat conductivity from the appliance to the bimetallic element of the thermostat provided by said aluminum washer.

7. A thermostat, comprising, a temperature responsive member, a stress member having a shank and a head and holding said temperature responsive member in said thermostat, said head on said stress member being of a metal of considerably better heat conductivity than said shank, said head being positioned contiguous to said temperature responsive member, whereby, upon fastening said thermostat to an appliance by a mounting member, said head is also contiguous with said appliance.

8. A thermostat, comprising, a base, a rivet, a bimetallic member, a stack in said thermostat including said rivet, base and one end of said member, a hollow shank on said rivet, first and second heads on opposite ends of said rivet, said second head being positioned against said base to hold said stack and the elements carried thereby firmly relative to said base, said first head having first and second parts, said first part of said first head being integral with said shank, said second part of said first head being of a metal of considerably better heat conductivity than said shank, said second part having a stepped bore to receive said shank in the smaller portion of the bore and to receive said first head in the larger portion of the bore, said first head being positioned contiguous to said bimetallic member, whereby, upon fastening said thermostat to an appliance by a mounting member passed through said hollow shank, said metal washer is also contiguous with said appliance.

9. A thermostat comprising, a base, a rivet, a bimetallic member, a stack in said thermostat including said rivet, base and one end of said member, a hollow shank on said rivet, first and second heads on opposite ends of said rivet, said second head being positioned against said base to hold said stack and the elements carried thereby firmly relative to said base, said first head having first and second parts, said first part of said first head being integral with said shank and having a first outer planar surface, said second part of said first head being of a metal of considerably better heat conductivity than said shank, a second outer planar surface on said aluminum washer, said second part having a stepped bore to receive said shank in the smaller portion of the bore and to receive said first head in the larger portion of the bore to a point whereat said first and second planar surfaces are substantially coplanar and to hold said second part on said first part at least in the axial direction away from said second head, said first head being positioned contiguous to said bimetallic member whereby, upon fastening said thermostat to an appliance by a mounting member passed through said hollow shank, said second outer planar surface of said metal washer is also contiguous with said appliance to effect good heat transfer from said appliance to said bimetallic member.

10. A thermostat comprising, a base, insulator washers, a rivet, first and second elongated flexible members, an elongated bimetallic member, a stack in said thermostat including said rivet, washers, base and one end of each of said members with said insulator washers providing an insulative mounting for said flexible members relative to each other, a hollow steel shank of a given wall thickness on said rivet, first and second heads on opposite ends of said rivet, said second head being pressed over against said base to hold said stack and the elements carried thereby firmly relative to said base, said first head having first and second parts, said first part of said first head being integral with said steel shank and having a first outer planar surface, said second part of said first head being of metal of good heat conductivity and considerably softer than said steel shank, said second part having an outer diameter at least twice the outside diameter of said steel shank, a second outer planar surface on said metal washer, said second part being sufficiently softer to permit same being pressed upon said first part to cause indentation into said second part to a point whereat said first and second planar surfaces are substantially coplanar and to hold said second part on said first part at least in the axial direction away from said second head, said first head being positioned contiguous to said bimetallic member, whereby, upon fastening said thermostat to an appliance by a mounting member passed through said hollow shank, said second outer planar surface of said metal washer is also contiguous with said appliance to effect good heat transfer from said appliance to said bimetallic member.

11. A thermostat comprising, a base, insulator washers, a rivet, first and second elongated flexible contact carrying members, an elongated bimetallic member, a stack in said thermostat including said rivet, washers, base and one end of said members with said insulator washers providing an insulative mounting for each of said flexible members relative to said rivet, a hollow steel shank of a given wall thickness on said rivet, first and second heads on opposite ends of said rivet, said second head being pressed over against said base to hold said stack and the elements carried thereby firmly relative to said base, said first head having first and second parts, said first part of said first head being integral with said steel shank and having a first outer planar surface, said second part of said first head being of aluminum of good heat conductivity and considerably softer than said steel shank, said second part having an outer diameter at least twice the outside diameter of said steel shank and a thickness at least twice the said wall thickness of said steel shank, a second outer planar surface on said aluminum washer, said second part being sufficiently softer to permit same being pressed upon said first part to cause indentation into said second part to a point whereat said first and second planar surfaces are coplanar and to hold said second part on said first part at least in the axial direction away from said second head, said first head being positioned contiguous to said bimetallic member, whereby, upon fastening said thermostat to an appliance by a mounting member passed through said hollow shank, said second outer planar surface of said aluminum washer is also contiguous with said appliance to effect good heat transfer from said appliance to said bimetallic member, and said steel shank has sufficient strength to resist any tension and compression forces therein.

12. A stress member for a thermostat, comprising, a shank, a composite head on one end of said shank formed of first and second parts, said first part being attached to said shank and composed of essentially the same material, said second part being of good heat conductivity relative to said first part and having a portion interfitting with said first part, a first contact surface on said first part, and a second contact surface on said second part coplanar with said first contact surface, whereby said stress member may be assembled in a thermostat with said first and second contact surfaces contiguous to a temperature responsive element therein.

13. A rivet for a thermostat having a bimetallic element and for use in an appliance in which the thermostat may be fastened, said rivet comprising a metal shank, an integral head on one end of said shank, a washer of good heat conductivity relative to said shank and having a portion interfitting with said head, first and second coplanar contact surfaces on said head and said washer respectively, whereby said rivet may be assembled in a thermostat with said washer contiguous to one of said bimetallic element and said appliance, and with said first and second contact surfaces contiguous to the other of said bimetallic element and said appliance in which the thermostat may be fastened with good heat conductivity from the appliance to the bimetallic element of the thermostat provided by said washer.

14. A rivet for a thermostat having a bimetallic element and for use in an appliance, comprising, a metal shank, an integral head on one end of said shank, a washer of good heat conductivity relative to said shank and having a portion interfitting with said head, a first contact surface on said head, and a second contact surface on said washer co-planar with said first contact surface, whereby said rivet may be assembled in a thermostat with said washer contiguous to a bimetallic element therein and contiguous to an appliance to which the thermostat may be fastened with good heat conductivity from the appliance to the bimetallic element of the thermostat provided by said washer.

References Cited in the file of this patent
UNITED STATES PATENTS

| | | |
|---|---|---|
| 2,567,138 | Weiland | Sept. 4, 1951 |
| 2,707,215 | Chinn | Apr. 26, 1955 |
| 2,718,572 | Harris | Sept. 20, 1955 |